United States Patent
Steinlechner

(10) Patent No.: US 6,369,880 B1
(45) Date of Patent: Apr. 9, 2002

(54) DEVICE FOR MEASURING DISTANCE USING A SEMICONDUCTOR LASER IN THE VISIBLE WAVELENGTH RANGE ACCORDING TO THE RUNNING TIME METHOD

(75) Inventor: Siegbert Steinlechner, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/601,413

(22) PCT Filed: Dec. 1, 1999

(86) PCT No.: PCT/DE99/03797

§ 371 Date: Oct. 12, 2000

§ 102(e) Date: Oct. 12, 2000

(87) PCT Pub. No.: WO00/33104

PCT Pub. Date: Jun. 8, 2000

(30) Foreign Application Priority Data

Dec. 1, 1998 (DE) ......................................... 198 55 296

(51) Int. Cl.[7] ................................................. G01C 3/08
(52) U.S. Cl. ...................... 356/5.11; 356/5.12; 356/5.15
(58) Field of Search ............................... 356/5.11, 5.12, 356/5.15

(56) References Cited

U.S. PATENT DOCUMENTS

| 4,146,328 A | * | 3/1979 | Hullein et al. | ............. | 356/5.11 |
| 5,082,364 A | * | 1/1992 | Russell | ....................... | 356/5.15 |
| 5,815,251 A | * | 9/1998 | Ehbets et al. | ............... | 356/5.01 |

FOREIGN PATENT DOCUMENTS

| DE | 27 45 553 | 5/1978 |
| DE | 43 03 804 | 8/1994 |
| DE | 43 16 348 | 11/1994 |
| DE | 44 11 218 | 9/1995 |
| EP | 0 475 326 | 3/1992 |
| FR | 2 209 111 | 6/1974 |

* cited by examiner

Primary Examiner—Thomas H. Tarcza
Assistant Examiner—Fred Mull
(74) Attorney, Agent, or Firm—Kenyon & Kenyon

(57) ABSTRACT

A device for distance measurement using a semiconductor laser in the visible wavelength range, which functions according to the echo time method, includes a collimation objective for bundling the transmitted measuring beam bundle, a circuit arrangement for modulating the measuring beam, a receiving objective for receiving and imaging the measuring beam bundle reflected at the distant object onto a receiving device, and an evaluation device for determining and displaying the distance measured to the object. The circuit arrangement for modulating the measuring beam and the evaluation device can be switched between two different operating modes. In the first operating mode, the modulation takes place using a first frequency and in the second operating mode using a second frequency. These frequencies stand in a whole-member ratio to each other. The reflected signal in the first operating mode is multiplied using a third frequency and in the second operating mode using a fourth frequency, before they are sampled for evaluation, in the first operating mode using a first sampling frequency and in the second operating mode using a second sampling frequency. In this context, the first sampling frequency is the difference between the fourth and the second frequency, and the second sampling frequency is a whole-number fraction of the second frequency.

18 Claims, 3 Drawing Sheets

DEVICE FOR MEASURING DISTANCE USING A SEMICONDUCTOR LASER IN THE VISIBLE WAVELENGTH RANGE ACCORDING TO THE RUNNING TIME METHOD

FIELD OF THE INVENTION

The present invention relates to a device for measuring distance using a semiconductor laser in the visible wavelength range in accordance with the echo time method, the distance between the range finder and the sighted object being determined from the duration of the time elapsing between the transmission and reception of a laser modulation signal as a value for the distance.

BACKGROUND INFORMATION

Various range finders are known, which operate using lasers, for example, as distance measuring systems in motor vehicles or as level meters in silos. The systems usually operate using infrared pulse laser diodes of a very high-performance type, in which the pulse echo time to the object and back is measured.

German Published Patent Application No. 43 16 348 describes a portable laser range finder that operates using visible laser light. The distance is determined using the echo time method. In this context, the distance between the range finder and the sighted object is determined from the duration of the time elapsing between the transmission and reception of a laser pulse reflected by the object, as a value for the distance. The laser beam is bundled into a measuring beam bundle using a collimation objective; a circuit arrangement for modulating the measuring beam, a receiving objective for receiving and imaging the measuring beam bundle reflected by the distant object onto a receiving device, and an evaluation device for determining and displaying the distance measured to the object, are provided. Calibration is accomplished by a mechanical deflector shutter, which generates as a reference distance a light path of a known length. The coupling of the light received from the receiving lens into the photo diode takes place via a fiber-optic guide, whose entry surface, in accordance with one exemplary embodiment, is electromechanically adjusted to the distance-dependent focus. In the range finder, the emphasis lies in the optomechanical configuration, i.e., on the optically possible focusing in the receiving diode. Nothing is asserted concerning the type of evaluation and the evaluation method used.

In German Patent No. 4303 804, a laser range finder is described, in which the laser beam is modulated using two aliquant frequencies of the same order of magnitude, one after the other. In this context, an object is measured by the transmission light beams modulated using both modulation frequencies, one after the other. The two measuring values are compared in an evaluation unit to determine the distance of the object. The change in the modulation frequencies takes place as a function of the speed of the observed object.

Furthermore, a laser range finder is described in German Patent No. 44 11 218, the distance here also being determined according to the echo time principle. The emphasis in this document lies in the configuration of the electrical switchover between a reference and a receiving diode, in order to combine the two beams as early as possible and to avoid drift problems.

SUMMARY OF THE INVENTION

A device according to the present invention for measuring distance has an advantage in that the distance measurement is carried out in two operating modes. The first operating mode yields a larger uniqueness range and a smaller resolution. In the second operating mode, a high resolution is attained at a smaller uniqueness range. The combination of the two operating modes assures a large uniqueness range and high resolution. In this context, the expense for the modulation and for the evaluation is small, as a result of the skillful selection of parameters.

In principle, this is achieved through the present invention as a result of the fact that the circuit arrangement, for modulating the measuring beam, and the evaluation device can be switched between two different operating modes, the modulation taking place in the first operating mode, using a first frequency $f_1/n$ and, in the second operating mode, using a second frequency $f_1$, which have a whole number ratio n to each other, and that the reflected signal in the first operating mode is multiplied using a third frequency $f_2/n$ and in the second operating mode using a fourth frequency $f_2$, before they are sampled for evaluation purposes, in the first operating mode using a first sampling frequency $f_{a1}$ and in the second operating mode using a second sampling frequency $f_{a2}$, first sampling frequency $f_{a1}$ being the difference between fourth frequency $f_2$ and second frequency $f_1$, and second sampling frequency $f_{a2}$ being a whole-number fraction q of second frequency $f_1$.

In an exemplary embodiment of the device according to the present invention, it is provided that the reflected signal mixed through multiplication in an analog mixer is filtered, in the first operating mode, in a first band pass using a first band-pass center frequency $\Delta f/n$, and in the second operating mode, in a second band pass, using a second band pass center frequency $\Delta f$, the two band pass center frequencies standing in a whole-number ratio n to each other.

In another exemplary embodiment according to the present invention, an analog/digital converter is provided, using which the sampling of the mixed reflected signal is carried out.

In a further simplification and easing of the evaluation, according to another embodiment according to the present invention, it is provided that in the second operating mode divider q is selected such that a subsampling is achieved using second sampling frequency $f_{a2}$ of the mixed, reflected, and possibly band-pass filtered signal at second center frequency $\Delta f$, and specifically such that, as a result of aliasing in the analog/digital converter, second center frequency $\Delta f$, divided into the second sampling frequency, is represented by whole number n $f_{a2}/n$, the following applying:

| | |
|---|---|
| $f_{a2} = f_1/q$ | second sampling frequency |
| $\Delta f = f_1/k$ | signal frequency after mixing |
| $f_{a2}/n = \|\Delta f - f_{a2}\|$ | frequency after sampling using $f_{a2}$. |

In an embodiment according to the present invention, a microprocessor is provided as a control computer for the evaluation.

In another embodiment according to the present invention, the phase measurement of the reflected, mixed, and preferably band-pass filtered, as well as sampled, signal is carried out using a discrete Fourier transformation in the control computer.

In yet another embodiment of the device for the measurement of distance according to the present invention, a digital mixer is provided, for the measurement of distance, a digital mixer is provided, in which, as a reference signal for the control computer, a signal is generated that marks the temporal position of the specific first of n sampling values. The evaluation and sampling is particularly simple when for n the value 4 is adopted, because in that case for the Fourier transformation only addition and subtraction are required. This is also possible using a simple microprocessor as the control computer.

In another embodiment according to the present invention, it is provided that, as a receiving device, a photo diode is provided which can be switched over by the control computer such that, alternately, it receives either the beam from the measuring object or, via a calibration segment, the beam from the measuring beam bundle. It is advantageous if the switchover takes place electrically, and a second photo diode is provided.

In an embodiment according to the present invention, it is provided that the control computer undertakes the switchover into the calibration mode automatically in response to each measurement.

It is advantageous that the phase measurement in the calibration phase is also carried out using a discrete Fourier transformation in the control computer. In this context, in a simple and advantageous configuration of the control computer, the phase value measured in the calibration phase is subtracted from the phase value determined in the measurement.

In a particularly advantageous and expedient design of the device according to the present invention, it is provided that, as the receiving objective, a Fresnel lens, in particular, made of plastic, is provided, and that in this Fresnel lens a thin opaque (that is, light-tight) tube is provided, outside the optical axis of the receiving objective, through which the collimated measuring beam bundle emerges. As a result of this configuration, it is assured that no optical cross talk between transmitter and receiver arises, and as a result of the parallax arising in this manner in the local environment, a too powerful increase of the receiving signal reflected by the measuring object is prevented.

DETAILED DESCRIPTION

Figure 1:
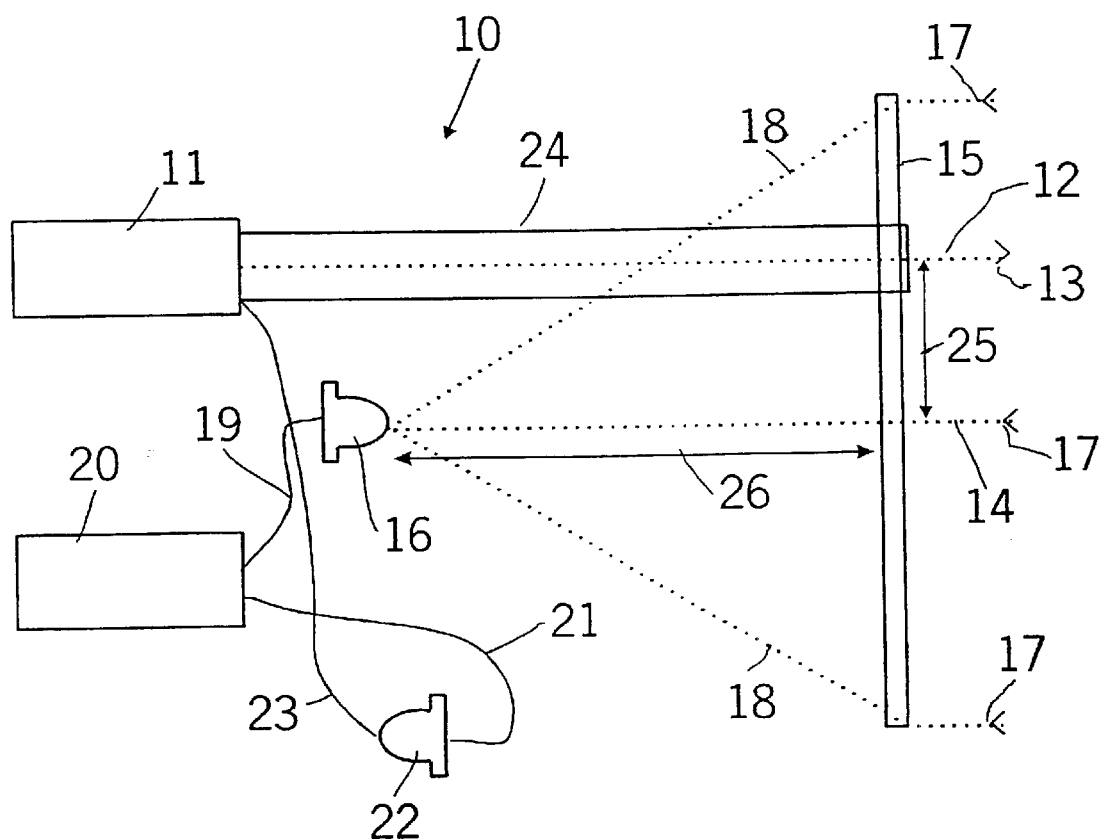
FIG. 1 schematically depicts an optical arrangement and some elements of a range finder according to the present invention.

In FIG. 1, the optical arrangement and some parts of a measuring instrument according to the present invention are schematically depicted. A range finder 10 includes a laser having a collimator 11, which emits a measuring beam bundle 12 in the direction of arrow 13 at an object being sighted which is not depicted in FIG. 1. Measuring beam bundle 14 reflected by the object is projected by a lens 15 onto photo diode 16. Lens 15 and photo diode 16 function as a receiving device for the beam impinging in the direction of arrow 17. This beam is represented outside the lens by the marginal rays and in the area between lens (15) and photo diode 16 by marginal ray 18, photo diode 16 in its light-sensitive arrangement being disposed in the vicinity of the focal point of lens 15. The signal received from photo diode 16 is conducted over a line 19 to an evaluation device 20, just as a calibration signal is input over a line 21 to a reference photo diode 22. Reference photo diode 22 is exposed to a part of measuring beam bundle 12 via a calibration segment 23, which is composed of a segment of plastic or glass. All measuring beam bundle 12 generated by the laser having collimator 11 is conveyed through an opaque tube 24, the end of tube 24 extending through lens 15. In this context, tube 24 having its longitudinal axis parallel to optical axis 14, on which the center beam of the reflected signal impinges, is offset by a distance 25. Photo diode 16 is arranged at a distance 26 from lens 15. As a result of opaque tube 24, optical cross talk is prevented between the transmitter, represented by the laser having collimator 11, and the receiver, represented by photo diode 16 and evaluation device 20. In addition, as a result of the parallax arising in this manner in the local environment, a too steep increase of the receiving signal, represented by the measuring beam bundle reflected by the object, is prevented. Lens 15 is preferably a Fresnel lens, which is preferably composed of plastic. In FIG. 1, it is only represented schematically.

Figure 2:
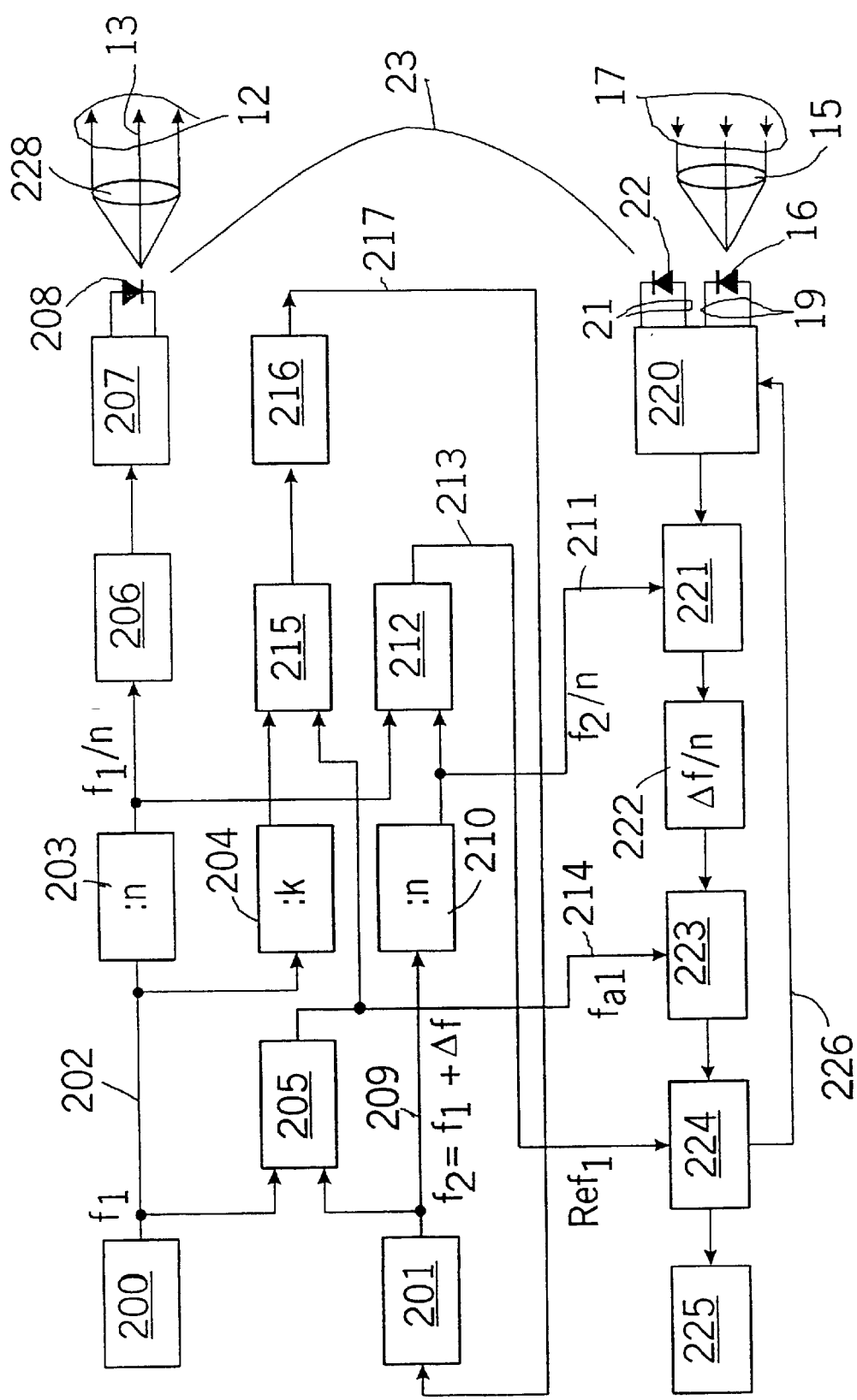
FIG. 2 schematically depicts a block diagram including circuit components that participate in a first mode of operation of a device for measuring distance according to the present invention.
Figure 3:
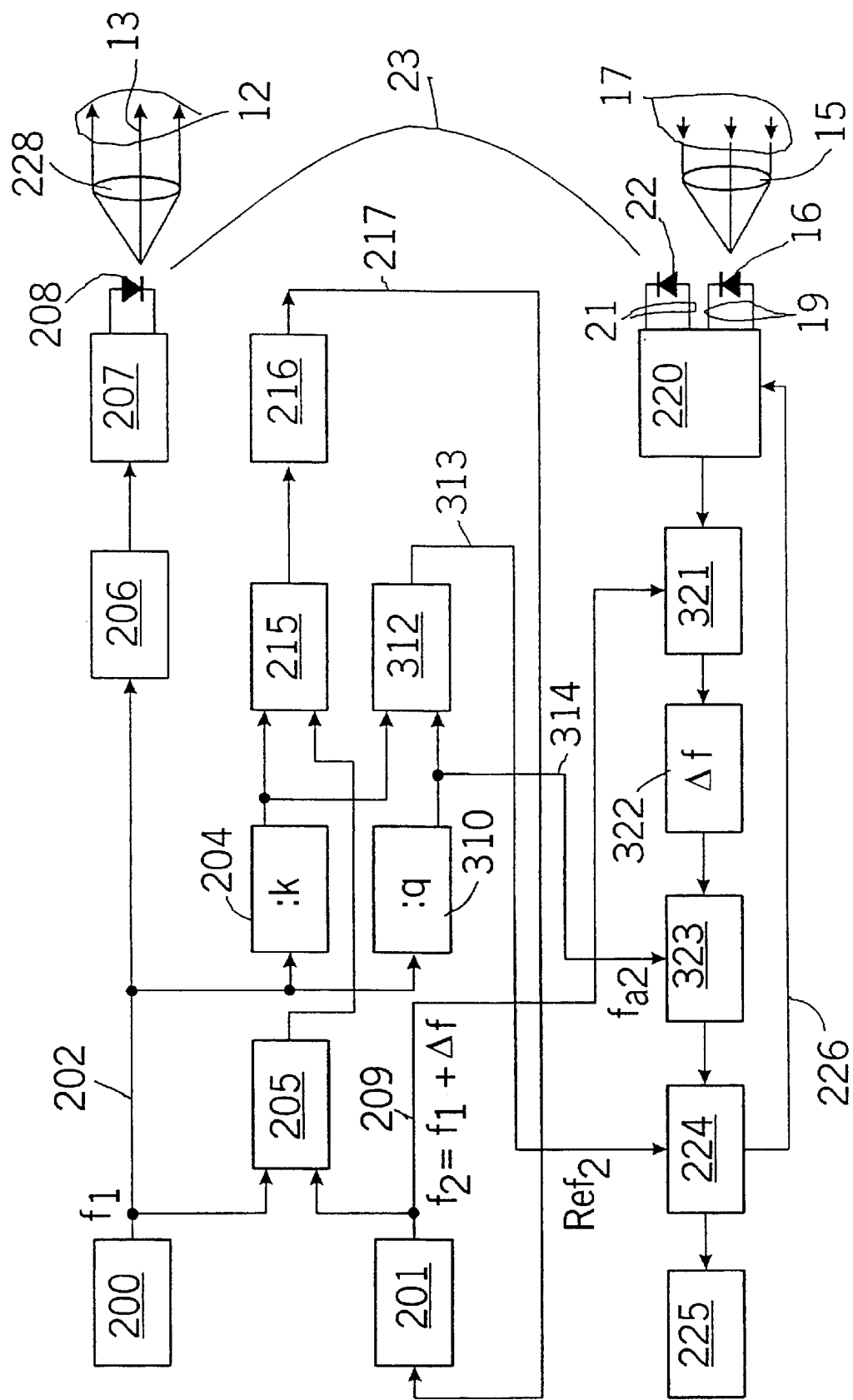
FIG. 3 schematically depicts a block diagram including circuit components that participate in a second mode of operation of the device for measuring distance according to the present invention.

In FIGS. 2 and 3, block diagrams are schematically depicted illustrating circuit components, which participate in the operation of the device for measuring distance in the first as well as in the second operating mode. In this context, the same circuit components, having application in both operating modes, are indicated using the same reference numerals.

In the arrangement for the first operating mode, an oscillator 200 is provided, which at its output line 202 emits a frequency $f_1$, which is fed to a divider circuit :n 203 as well as to a divider circuit :k 204 and to a digital mixer 205. The output of divider circuit 203, frequency $f_1/n$, is fed to a pulse shaper 206, which acts upon a laser regulator and modulator 207. From a semiconductor laser diode 208, a beam is emitted through a collimation lens 228, the beam, as the measuring beam bundle 12, being emitted in the direction of arrow 13 to the object being sighted. A second oscillator 201 generates a frequency $f_2=f_1+\Delta f$ at its output line 209. This frequency $f_2$ is fed to digital mixer 205 and to a partial circuit :n 210. The output signal of digital mixer 205 is fed on line 214 to phase comparator 215, whose second input is the output of partial circuit :k 204. The output signal of phase comparator 205 is fed, via a low pass 216 and its output line 217, as the input signal to oscillator 201. This oscillator 201 is preferably configured as a voltage-controlled oscillator.

Measuring beam bundle 17 reflected by the object being sighted, hereinafter designated as input signal 17, is focused on photo diode 16 by lens 15. This receiving photo diode 16 is connected via line 19 to a photo receiver circuit 220. Similarly connected to this photo receiver circuit 220 is, via line 21, reference photo diode 22, which via line 23 receives a part of the measuring beam bundle from semiconductor laser diode 208. The output signal of photo receiver circuit 220 is fed to an analog mixer 221, which, as the second input, receives output line 211 from partial circuit :n 210, i.e., frequency $f_2/n$. Using this frequency, the receiving frequency is mixed. The mixed signal, as the output of the analog mixer 221 is band-pass filtered through a band pass 222, having band-pass center frequency $\Delta f/n$, and is thereupon fed to an analog/digital converter 223. There, the receiving signal treated in this way is sampled using a sampling frequency $f_{a1}$ that is supplied on line 214, the sampling frequency being supplied by digital mixer 205. This signal is processed in a control computer 224, which is preferably a microprocessor. A reference signal $Ref_1$ assists in the processing, the signal being supplied on line 213 from digital mixer 212. The output signal of control computer 224 is made visible on a display 225. Photo receiver circuit 220 is controlled by control computer 224 via a line 226, specifically such that either the calibration signal from reference photo diode 22 or the measuring signal from receiving diode 16 is supplied to the processing segment.

In the second operating mode, in some embodiments according to the present invention the same circuit components participate as in the first operating mode in accordance with the representation in FIG. 2. In contrast to the first operating mode and to the representation in FIG. 2, frequency $f_1$ is supplied to pulse shaper 206 on line 202 directly from oscillator 200 for modulation. As reference signal $Ref_2$, control computer 224 receives a reference signal on line 313 from a digital mixer 312. Mixer 312 has fed to it as the input signal on line 314, on the one hand, the output signal of partial circuit :q 310 and, on the other hand, the output signal of partial circuit :k 204. The output signal on line 314 of partial circuit :q 310 is sampling frequency $f_{a2}$, which is fed to analog/digital converter 323 for sampling. The mixing of the input signal amplified by photo receiver circuit 220 takes place in an analog mixer 321, to which, as the mixing frequency, frequency $f_2=f_1+\Delta f$ is supplied on line 209. This mixed signal is filtered through a band-pass filter 322, having band-pass center frequency $\Delta f$.

It should be noted that in practical execution, both analog/digital converter 223 and 323 as well as analog mixers 221 and 321 may be, in each case, realized only through one circuit component.

The circuit arrangement depicted in FIGS. 2 and 3 for modulating the measuring beam and for evaluating the input signal provides that they can be switched over between two different operating modes. In the first operating mode, modulation takes place using a first frequency $f_1/n$ via pulse shaper 206 of laser regulator and modulator 207, and in the second operating mode, modulation takes place using a second frequency $f_1$. These two frequencies stand in a whole-number relationship n to each other. Reflected signal 17 in the first operating mode is multiplied by a third frequency $f_2/n$ and in the second operating mode by a fourth frequency $f_2$, before it is sampled for evaluation, in the first operating mode, using a first sampling frequency $f_{a1}$ and, in the second operating mode, using a second sampling frequency $f_{a2}$. In this context, first sampling frequency $f_{a1}$ is the difference between fourth frequency $f_2$ and second frequency $f_1$, namely $\Delta f$, and second sampling frequency $f_{a2}$ is a whole-number fraction q of second frequency $f_1$, namely $f_1/q$. The sampling using two different sampling frequencies $f_{a1}$ and $f_{a2}$ takes place, in the first operating mode, in analog/digital converter 223, and, in the second operating mode, in 323.

The input signal, which is amplified by photo receiver circuit 220, is multiplicatively mixed, in the first operating mode, in analog mixer 221 using frequency $f_2/n$ and is filtered using band pass 222 having band-pass center frequency $\Delta f/n$. In the second operating mode, the mixing takes place, using frequency $f_2$, and band pass 322 for the second operating mode has band-pass center frequency $\Delta f$. Thus the two band-pass center frequencies in an advantageous manner stand in a whole-number ratio n to each other.

The principle of operation of the device according to the present invention is explained in what follows:

A semiconductor laser, in the form of a semiconductor laser diode 208, is used, which emits a beam in the visible wavelength range. The average laser output, which lies below 1 MW in laser class 2, is kept constant by control and modulation circuit 207. The laser beam is bundled by collimator 228. The modulation takes place as a result of pulse shaper 206 having short square-wave pulses at repeat frequency $f_1$ or $f_1/n$. The device is furnished with two operating modes, modulation taking place in the first operating mode using frequency $f_1/n$ for the rough measurement of the distance to the object being sighted, and modulation taking place in the second operating mode using frequency $f_1$ for the precise measurement of the distance.

Frequency $f_1$ is generated in oscillator 200. Oscillator 201 generates mixer signals for mixing the receiving frequency. The regulation of frequency $f_2$ of oscillator 201 takes place through a phase-regulated loop (PLL phase-locked loop), such that frequency $f_2$ is equal to first frequency $f_1$ plus a differential frequency $\Delta f$, differential frequency $\Delta f$ being a whole-number quotient of the frequency of oscillator 200, namely $\Delta f=f_1/k$, k being a whole number. Important for this regulation are digital mixer 205, partial circuit :k 204, phase comparator 215, downstream low pass 216, and oscillator 201, configured as a voltage-controlled oscillator.

For evaluation, a multiplication occurs of the receiving signal that is pre-amplified in photo receiver circuit 220 and frequency $f_2/n$, in the first operating mode, or frequency $f_2$, in the second operating mode, n being a whole number and the multiplication taking place in analog mixer 221 or 321. Then a band-pass filtering of the mixed receiving signal takes place using band-pass center frequency $\Delta f/n$ in the first operating mode or band-pass center frequency $\Delta f$ in the second operating mode. Thereupon, in the first operating mode, the sampling takes place in analog/digital converter 223 using sampling rate or sampling frequency $f_{a1}=\Delta f$, or in analog/digital converter 323 using the sampling rate or sampling frequency $f_{a2}=f_1/q$, where q is a whole number.

In the second operating mode, divider q is selected such that a subsample is achieved using second frequency $f_{a2}$ of the mixed, reflected, and possibly band-pass filtered input signal using second band-pass center frequency $\Delta f$, and specifically such that, through aliasing in analog/digital converter 323, second band-pass center frequency $\Delta f$ is imaged in frequency $f_{a2}/n$, the following applying:

| | |
|---|---|
| $f_{a2} = f_1/q$ | second sampling frequency |
| $\Delta f = f_1/k$ | signal frequency after mixing |
| $f_{a2}/n = \|\Delta f - f_{a2}\|$ | frequency after sampling using $f_{a2}$. |

In a device that is realized in practice in accordance with the present invention, which may be provided as an "electronic measuring tape" for home use, which, without contact, measures the distance between the range finder and the sighted measuring point, for example, on a wall or a room ceiling, the following values may be selected, for example.

| | |
|---|---|
| $f_1$ = 40665.000 kHz | frequency of oscillator 200 |
| k = 4096 | dividing factor |
| $\Delta f$ = 9928 Hz | frequency difference osc. 200 − osc. 201 |
| $f_2$ = 40674.928 kHz | frequency of oscillator 201 |

-continued

| | |
|---|---|
| n = 4 | dividing factor |
| q = 5120 | dividing factor |

First operating mode:

| | |
|---|---|
| $f_1/n$ = 10166.250 kHz | transmitting frequency |
| $f_2/n$ = 10168.732 kHz | mixing frequency |
| $\Delta f/n$ = 2482 Hz | signal frequency after mixing |
| $f_{a1} = \Delta f$ = 9928 Hz | sampling frequency |
| $x_{max} = c*n/(2*f_1)$ = 14.75 m | uniqueness range, where x signifies the distance and c signifies the speed of light. |

Second operating mode:

| | |
|---|---|
| $f_1$ = 40665.000 kHz | transmitting frequency |
| $f_2$ = 40674.928 kHz | mixer frequency |
| $\Delta f$ = 9928 Hz | signal frequency after mixing |
| $f_{a2} = f_1/q$ = 7942 Hz | sampling frequency |
| $f_{a2} = \Delta f - f_{a2}$ = 1986 Hz | signal frequency after sampling |
| $x_{max} = c/(2*f_1)$ = 3.69 m | uniqueness range, where x signifies the distance and c signifies the speed of light. |

The evaluation of the band-pass filtered and sampled receiving signal takes place in control computer 224, which may be configured as a microprocessor, as a result of the fact that the phase measurement of the receiving signal takes place through a discrete Fourier transformation. In each case, n sampling values at the output of analog/digital converter 223 or 323 describe a sinusoid. Signal $Ref_1$ or $Ref_2$, which is generated by digital mixer 212 or 312, characterizes the specific first value of n sampling values and thus functions as a reference phase in the first or second operating modes.

The calculation of the discrete Fourier transformation is particularly simple especially in the case depicted, in which n=4. If $x_i$ (i=0, 1, 2 . . . ) are the sampling values, then for phase $\Phi$ of the frequency line having frequency $f_a/4$, the following applies:

$$Re = x0 - x2 + x4 - x6 + \ldots - \ldots$$

$$Im = -x1 + x3 - x5 + x7 - \ldots + \ldots$$

$$\Phi = arc\ (Re + j*Im).$$

Therefore, for the discrete Fourier transformation only addition and subtraction need to be carried out.

Photo receiver circuit 220 can be controlled by control computer 224 via line 226, so that control computer 224 optionally receives light from the measuring object via receiving diode 16 or from the calibration segment via a reference photo diode 22. The calibration segment is composed of a segment of plastic or glass fiber 23, into which a small part of the transmission capacity of semiconductor laser diode 208 is beamed. The switchover takes place electrically, a second photo diode being used. Automatically, in response to each measurement, the switchover to the calibration mode is undertaken. In the calibration phase, the values are also measured by a discrete Fourier transformation and are derived from the phase of the receiving signal. In this manner, echo time drifts of the circuits used are eliminated.

In an embodiment according to the present invention, the combination of the two operating modes, which are provided by the present invention makes possible a large uniqueness range along with high resolution. This is due to the fact that a large uniqueness range and a less high resolution, in the first operating mode, and high resolution and a smaller uniqueness range, in the second operating mode, are combined with each other. All of the frequencies required for distance measurement are derived from frequency $f_1$ of oscillator 200, configured as a quartz oscillator. Oscillator 201 can also be designed as a quartz oscillator and can be regulated at the setpoint frequency via a variable capacitance diode. Drifts and tolerances of the participating components may be eliminated by a calibration segment that is capable of switching over.

As a result, the present invention makes it possible that, in both operating modes, the sampling frequency and the signal frequency after the sampling stand in a ratio to each other of n:1, where n is selected as a whole number (e.g., n=4, which makes the evaluation of the signals much simpler. In the second operating mode, the aliasing effect is exploited in order to produce the ratio n:1 between sampling frequency and signal frequency.

Through the application of the discrete Fourier transformation, a precise phase measurement is made possible in noise-affected signals. The discrete Fourier transformation is particularly simple when the selection is made of n=4, for example. In this case, for the discrete Fourier transformation, no multiplication is necessary, but rather only addition and subtraction. Thus the discrete Fourier transformation calculation can be carried out on simple, slow microprocessors in real time. The calculation of the phase from the result of the discrete Fourier transformation, namely $\Phi$=arc (Re+j*Im), leads to an Arcus-tangent calculation, which, however, can only be carried out once at the conclusion of the measurement. In this context, for example, table methods, CORDIC algorithms, or power series can be used. The specific optical arrangement depicted in FIG. 1 prevents optical cross talk and an excessive increase in the signal amplitude in the local environment.

What is claimed is:

1. A device for measuring a distance between a range finder and an object in accordance with an echo time method, comprising:

a semiconductor laser providing a measuring beam in a visible wavelength range;

a circuit arrangement coupled to the semiconductor laser, the circuit arrangement modulating the measuring beam, the circuit arrangement switching between a first operating mode and a second operating mode, the circuit arrangement modulating the measuring beam at a first frequency in the first operating mode and modulating the measuring beam at a second frequency in the second operating mode, the second frequency being in a first whole-number ratio with the first frequency;

a collimation objective coupled to the semiconductor laser, the collimation objective bundling the modulated measuring beam into a transmitted measuring beam bundle, the transmitted measuring beam bundle being reflect by the object;

a receiving objective coupled to a receiving device, the receiving objective receiving and imaging the reflected measuring beam bundle onto the receiving device, the receiving device providing a reflected signal; and an evaluation device coupled to the receiving device, the evaluation device determining and displaying the distance, the evaluation device switching between the first operating mode and the second operating mode, wherein, in the first operating mode, the evaluation device evaluates a signal corresponding to the reflected signal that has been multiplied by a third frequency before being sampled for evaluation using a first sampling frequency, wherein, in the second operating mode, the evaluation device evaluates a signal corresponding to the reflected signal that has been multiplied by a fourth frequency before being sampled for evaluation using a second sampling frequency, wherein the first sampling frequency is a difference between the fourth frequency and the second frequency, and wherein the second sampling frequency is in a second whole-number ratio with the second frequency.

2. The device according to claim 1, wherein the distance determined by the evaluation device is a function of at least a time duration corresponding to time elapsing between transmitting the measuring beam bundle and receiving the reflected measuring beam bundle.

3. The device according to claim 1, wherein the evaluation device includes an analog mixer coupled to the receiving device, the analog mixer mixing the reflected signal by multiplying, a first band pass filter coupled to the analog mixer, the first band pass filter having a first band-pass center frequency, the first band pass filter filtering the reflected signal that has been mixed in the first operating mode, and a second band pass filter coupled to the analog mixer, the second band pass filter having a second band-pass center frequency, the second band pass filter filtering the reflected signal that has been mixed in the second operating mode, the first band-pass center frequency being in the first whole-number ratio with the second band-pass center frequency.

4. The device according to claim 3, wherein the evaluation device includes a first analog-to-digital converter coupled to the first band pass filter, the first analog-to-digital converter sampling the reflected signal that has been filtered by the first band pass filter at the first sampling frequency in the first operating mode, and a second analog-to-digital converter coupled to the second band pass filter, the second analog-to-digital converter sampling the reflected signal that has been filtered by the second band pass filter at the second sampling frequency in the second operating mode.

5. The device according to claim 4, wherein, in the second operating mode, a divider q is selected such that the reflected signal, which has been mixed by the analog mixer and filtered by the second band pass filter, is subsampled using the second sampling frequency $f_{a2}$, wherein, in the second operating mode, through aliasing in the second analog-to-digital converter, the second band-pass center frequency $\Delta f$, divided into the second sampling frequency by a whole number n, is imaged, and wherein, the second sampling frequency is $f_{a2}=f_1/q$, a frequency of the reflected signal after mixing is $\Delta f=f_1/k$ and a frequency of the reflected signal after sampling using $f_{a2}$ is $f_{a2}/n = |\Delta f - f_{a2}|$, k being a whole number.

6. The device according to claim 1, wherein the evaluation device includes a control computer that includes a microprocessor, the control computer being coupled to at least one of the first analog-to-digital converter and the second analog-to-digital converter.

7. The device according to claim 6, wherein the control computer uses a discrete Fourier transformation technique in measuring a phase of a signal that corresponds to the reflected signal that has been mixed, band-pass filtered and sampled.

8. The device according to claim 6, further comprising:

at least one digital mixer coupled to the control computer, the at least one digital mixer providing at least one reference signal for controlling the control computer.

9. The device according to claim 8, wherein the at least one reference signal characterizes at least one signal that marks a temporal position of a first of n sampling values.

10. The device according to claim 6, wherein the receiving device includes a first photo diode and a second photo diode, the first photo diode receiving the reflected measuring beam bundle via the receiving objective, the second photo diode receiving the transmitted measuring beam bundle via a calibration segment, the receiving device being switched by the control computer such that one of (A) the control computer receives a signal that is a function of the reflected signal provided by the first photo diode and (B) the control computer receives a signal that is a function of the transmitted measuring beam bundle.

11. The device according to claim 10, wherein the signal that is the function of the transmitted measuring beam bundle is a calibration signal.

12. The device according to claim 11, wherein the control computer measures a phase of a signal that corresponds to the calibration signal using a discrete Fourier transformation technique.

13. The device according to claim 10, wherein the receiving device is switched electrically.

14. The device according to claim 10, wherein the control computer automatically undertakes the switching to the second photo diode in response to each measurement.

15. The device according to claim 10, wherein the control computer subtracts a phase value measured during calibration from a phase value determined during in a measurement.

16. The device according to claim 1, wherein the receiving objective is a Fresnel lens having an optical axis.

17. The device according to claim 16, wherein the Fresnel lens is made of a plastic material.

18. The device according to claim 16, further comprising:

a thin opaque tube coupled to the semiconductor laser and passing through the Fresnel lens, the thin opaque tube being disposed outside the optical axis, the bundled measuring beam emerging from the thin opaque tube.

* * * * *

UNITED STATES PATENT AND TRADEMARK OFFICE
CERTIFICATE OF CORRECTION

PATENT NO.      : 6,369,880 B1
DATED           : April 9, 2002
INVENTOR(S)     : Siegbert Steinlechner It is certified that error appears in the above-identified patent and that said Letters Patent is hereby corrected as shown below:

Column 4,
Line 9, change "or glass. All measuring beam" -- or glass fiber. The optical arrangement provides that measuring beam --.

Column 6,
Line 60, change "example." to -- example: --.

Signed and Sealed this

Twenty-seventh Day of May, 2003

JAMES E. ROGAN
*Director of the United States Patent and Trademark Office*